United States Patent
Al-Qaisi et al.

(10) Patent No.: US 11,562,484 B2
(45) Date of Patent: Jan. 24, 2023

(54) DEEP LEARNING FOR OPTICAL COHERENCE TOMOGRAPHY SEGMENTATION

(71) Applicant: Alcon Inc., Fribourg (CH)

(72) Inventors: Muhammad K. Al-Qaisi, Ladera Ranch, CA (US); Parisa Rabbani, Aliso Viejo, CA (US); Hugang Ren, Pleasonton, CA (US)

(73) Assignee: Alcon Inc., Fribourg (CH)

( * ) Notice: Subject to any disclaimer, the term of this patent is extended or adjusted under 35 U.S.C. 154(b) by 231 days.

(21) Appl. No.: 17/127,651

(22) Filed: Dec. 18, 2020

(65) Prior Publication Data

US 2021/0192732 A1 Jun. 24, 2021

Related U.S. Application Data

(60) Provisional application No. 62/950,530, filed on Dec. 19, 2019.

(51) Int. Cl.
  *G06T 7/00* (2017.01)
  *G06T 7/13* (2017.01)
  *G06T 3/60* (2006.01)

(52) U.S. Cl.
  CPC ............ *G06T 7/0012* (2013.01); *G06T 3/602* (2013.01); *G06T 7/13* (2017.01); *G06T 2207/10101* (2013.01); *G06T 2207/20084* (2013.01)

(58) Field of Classification Search
  CPC ......... G06T 7/0012; G06T 3/602; G06T 7/13; G06T 2207/10101; G06T 2207/20084; G06T 2207/20081; G06T 2207/30041
  See application file for complete search history.

(56) References Cited

U.S. PATENT DOCUMENTS

| | | |
|---|---|---|
| 8,369,595 B1 | 2/2013 | Derakhshani et al. |
| 2019/0209006 A1* | 7/2019 | Abou Shousha ...... A61B 3/103 |
| 2019/0295252 A1 | 9/2019 | Fuchs et al. |

OTHER PUBLICATIONS

F. Venhuizen, B. van Ginneken, B. Liefers, M. van Grinsven, S. Fauser, C. Hoyng, T. Theelen, and C. Sánchez, "Robust total retina thickness segmentation in optical coherence tomography images usingconvolutional neural networks," Biomed. Opt. Express 8, 3292-3316 (2017).

(Continued)

*Primary Examiner* — Siamak Harandi (57) ABSTRACT

Systems and methods are presented for providing a machine learning model for segmenting an optical coherence tomography (OCT) image. A first OCT image is obtained, and then labeled with identified boundaries associated with different tissues in the first OCT image using a graph search algorithm. Portions of the labeled first OCT image are extracted to generate a first plurality of image tiles. A second plurality of image tiles is generated by manipulating at least one image tile from the first plurality of image tiles, such as by rotating and/or flipping the at least one image tile. The machine learning model is trained using the first plurality of image tiles and the second plurality of image tiles. The trained machine learning model is used to perform segmentation in a second OCT image.

20 Claims, 8 Drawing Sheets

(56) References Cited

OTHER PUBLICATIONS

L. Fang, D. Cunefare, C. Wang, R. Guymer, S. Li, and S. Farsiu, "Automatic segmentation of nine retinal layer boundaries in OCT images of non-exudative AMD patients using deep learning and graph search," Biomed. Opt. Express 8, 2732-2744 (2017).

Pfister Martin, et al., Automated segmentation of dermal fillers in OCT images of mice using convolutional neural networks, Biomedical Optics Express, Feb. 19, 2019, p. 1315, vol. 10, No. 3, Biomedical Optics Express.

Saining Xie, et al., Holistically-nested edge detection, ARXIV, Dec. 1, 2015, pp. 1395-1403.

Sander Dieleman, et al., Exploiting cyclic symmetry in convolutional neural networks, arxiv. org, Cornell University Library, Feb. 8, 2016.

\* cited by examiner

DEEP LEARNING FOR OPTICAL COHERENCE TOMOGRAPHY SEGMENTATION

BACKGROUND

Field of the Disclosure

The present disclosure relates to image processing, and more specifically, to using machine learning models to perform biomedical image segmentation according to various embodiments of the disclosure.

Description of Related Art

In certain biomedical fields such as ophthalmology, images (e.g., an x-ray image, an optical coherence tomography (OCT) image, etc.) of patients' body parts (e.g., an eye) may be captured and analyzed for determining diagnoses for the patients. When analyzing the images, automated segmentation of elements within the images can transform qualitative images into quantitative measurements, which are helpful for both diagnostics and surgical guidance. However, automated image segmentation can be challenging. For example, due to artifacts that appear on the image such as speckles, the continuous thin boundaries between different types of tissues in an OCT image may become discontinuous, which makes it challenging for automatically identifying the different types of tissues in the OCT image. Furthermore, complicated pathological conditions may also make the image segmentation challenging.

Conventional segmentation algorithms rely on explicit description of the problem as well as detailed steps (e.g., explicit rules provided by designers of the algorithms) to solve the problem. This approach works well for images obtained from normal subjects (patients with no diseases), whose anatomical structures follow rules that can be established from a normative human database. However, for human subjects with different diseases, the anatomical structures can vary substantially from normal conditions, making OCT image segmentation challenging. For example, the boundaries between different types of tissues within an eye of someone who has a pathological condition may not follow the patterns of a normal eye. Therefore, there is a need in the art for providing an effective mechanism for automatically segmenting an OCT image.

SUMMARY

According to some embodiments, a system includes a non-transitory memory and one or more hardware processors configured to read instructions from the non-transitory memory to cause the system to perform operations comprising: obtaining an optical coherence tomography (OCT) image; determining edges in the OCT image based on an edge detection algorithm; generating a plurality of image tiles based on the OCT image; generating a plurality of additional image tiles by manipulating at least one image tile of the plurality of image tiles; and training a machine learning model for predicting edges in OCT images based on the plurality of image tiles and the plurality of additional image tiles.

According to some embodiments, a method includes obtaining a biomedical image; determining boundaries of different tissues in the biomedical image based on an edge detection algorithm; generating a first plurality of image tiles based on the biomedical image; generating a second plurality of image tiles by manipulating at least one image tile of the first plurality of image tiles; and training, by one or more hardware processors, a machine learning model for segmenting biomedical images based on the first plurality of image tiles and the second plurality of image tiles.

According to some embodiments, a non-transitory machine-readable having stored thereon machine-readable instructions executable to cause a machine to perform operations including: obtaining an optical coherence tomography (OCT) image; analyzing the OCT image based at least in part on an edge detection algorithm; generating a first plurality of image tiles based on the analyzing the OCT image; generating a second plurality of image tiles by manipulating at least one image tile of the first plurality of image tiles; and training a machine learning model for segmenting OCT images based on the first plurality of image tiles and the second plurality of image tiles.

BRIEF DESCRIPTION OF THE DRAWINGS

For a more complete understanding of the present technology, its features, and its advantages, reference is made to the following description, taken in conjunction with the accompanying drawings.

In the figures, elements having the same designations have the same or similar functions.

DETAILED DESCRIPTION

This description and the accompanying drawings that illustrate inventive aspects, embodiments, implementations, or modules should not be taken as limiting—the claims define the protected invention. Various mechanical, compositional, structural, electrical, and operational changes may be made without departing from the spirit and scope of this description and the claims. In some instances, well-known circuits, structures, or techniques have not been shown or described in detail in order not to obscure the invention. Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

The technology described below involves systems and methods to provide a machine learning model for automatically segmenting an image (e.g., a biomedical image such as an x-ray image, an optical coherence tomography (OCT) image, etc.), where the machine learning model is trained using training data artificially generated based on manipulations of existing training images. As discussed above, OCT image segmentation can be challenging due to factors such as artifacts (e.g., speckles) that appear on the image and complicated pathological conditions of the patients. Conventional algorithms, such as a graph search algorithm, have been used (e.g., implemented in computers) for performing OCT image segmentation in the past. However, these algorithms may be effective only for performing segmentation on images of normal patients (e.g., patients with no diseases), whose anatomical structures follow rules (or patterns) that can be established from a normative human database. These algorithms may not be effective for performing segmentation on OCT images that include artifacts and/or OCT images taken of patients who have pathological conditions, as the anatomical structures of these patients with complicated pathological conditions may follow different patterns or follow no patterns at all.

In some embodiments, a machine learning model may be configured to perform segmentation of images (e.g., x-ray images, OCT images, etc.). The machine learning model may be trained using training data, such as images of patients obtained in the past. One advantage of using a machine learning model, such as a convolutional neural network (CNN) over a conventional algorithm to perform biomedical image segmentation is that the machine learning model does not rely on explicit rules regarding how to segment images. Rather, with sufficient training data, the machine learning model can derive the rules by itself and continuously evolve (e.g., modify and/or correct the rules) based on new training data. As such, given a large amount of high quality training data, the machine learning model can be trained to accurately and effectively segment images. In the past, generating the training data requires human operators to manually analyze and label the boundaries of the different tissue types in existing images to determine the ground truth. However, not only that it is tedious and error prone to generate training data in this manner, it is also difficult to generate a large amount of training data due to the manual labor involved. As the performance of a machine learning model is largely dependent on the amount and the quality of training data that trains the machine learning model, the performance of the machine learning model would likely suffer when the training data is generated in this manner.

As such, according to various embodiments of the disclosure, a training system may be provided to automatically generate a large amount of high quality training data for training a machine model configured to perform image segmentation. In some embodiments, the training system may obtain training images. The training images may be existing images taken of patients in the past. In some embodiments, the training data system may use a conventional algorithm (e.g., a graph search algorithm) as well as manual or semi-automated annotations to analyze and label the training images (e.g., by identifying boundaries (also referred to as edges) of different types of tissues, such as different layers of an eye, in the training images). As discussed herein, one drawback of using a conventional algorithm to segment images is that the conventional algorithm may not be effective in performing segmentation on images having a substantial amount of artifacts (e.g., speckles) or images of patients with different pathological conditions (e.g., different eye diseases). As such, the training data generated by using the conventional algorithm may be limited to only clean images (e.g., images that do not have substantial amounts of artifacts) and images of normal patients. In order to expand the training data to cover images of patients having various pathologies, the training system of some embodiments may artificially generate additional training data by manipulating the existing training images.

In some embodiments, the training system may obtain image tiles (e.g., patches) from each training image. Different embodiments may use different techniques in obtaining image tiles from a training image. In some embodiments, the training system may divide the training image into multiple tiles. For example, from an image having a size of 160 by 40 pixels, the training system may divide the image into sixty-four (64) equally-sized (10 by 10 pixels) tiles. In some embodiments, the training system may obtain a device attribute (e.g., a memory size of a graphical processing unit) of the device that is configured to generate the training data, and may divide the image based on the device attribute. For example, the training system may determine a tile size that does not exceed the memory size of the graphical processing unit of the device, and may then divide the image into tiles based on the tile size.

In some embodiments, the training system may also perform one or more analyses on the image and may divide the image based on the one or more analyses. For example, the training system may perform a pixel analysis to determine portions of the image that do not include relevant data (e.g., portions of the image that include background or blank data). In this regard, the training system may analyze the pixel value of each pixel in the image to determine portions of the image having contiguous pixels with substantially similar (or identical) pixel values (e.g., spatial frequency within the portions below a threshold). The training system may then eliminate (e.g., remove) the portions of the image before dividing the image into the multiple tiles.

In some embodiments, instead of dividing the image into multiple tiles, the training system may generate the image tiles by extracting different image portions from the image. For example, the training system may generate a virtual window having the determined tile size (e.g., 10 by 10 pixels). The training system may place the virtual window at an initial position (e.g., top left corner) of the image. The training system may analyze the portion of the image within the virtual window to determine whether the portion of the image passes a relevance threshold. If it is determined that the portion of the image passes the relevance threshold, the training system may extract the portion of the image as an image tile. On the other hand, if it is determined that the portion of the image does not pass the relevance threshold, the training system may ignore the portion of the image. In some embodiments, the training system may determine whether a portion of image passes the relevance threshold based on one or more factors, such as whether a spatial frequency of the portion of image exceeds a spatial frequency threshold, whether the portion of the image includes labeled data (e.g., includes a portion of a boundary of different tissues labeled by the graph search algorithm), etc.

After extracting (or ignoring) the portion of the image within the virtual window, the training system may then move the virtual window to another position to cover another portion of the image (e.g., moving the virtual window by a predetermined number of pixels to the right, to the bottom, etc.). The training data system may continue to analyze different portions of the image covered by the virtual window and extract the portions that pass the relevance threshold. Based on the predetermined movement of the virtual window, the different portions of the image cover by the virtual window may or may not overlap with each other, such that the image tiles extracted from the image may be partially overlapping. Each image tile that is extracted from the image can become a distinct piece of training data for training the machine learning model. By independently analyzing different portions of the image and extracting only the portions that are relevant may substantially improve the quality of the training data.

Since the initial training images are images of normal patients (e.g., patients with no diseases), the tiles obtained from the images still would not be able to provide adequate training to the machine learning model for patients who have different types of pathologies. Thus, in some embodiments, the training system may generate additional training data corresponding to patients having various pathologies by manipulating the image tiles. For example, the training system may adjust the orientation of each tile (which effectively changing an orientation of the boundaries of the layers in the image tiles) to simulate images of patients having various pathologies. In some embodiments, the training system may generate additional tiles by rotating each tile by one or more rotations, where each additional tile corresponds to rotating the tile to a predetermined degree of rotation. For example, the training system may be configured to rotate each tile by 90 degrees, 180 degrees, and 270 degrees. Thus, for each original image tile, the training system may generate three additional tiles (e.g., three additional pieces of training data)—a first additional tile that corresponds to rotating the original tile by 90 degrees, a second additional tile that corresponds to rotating the original tile by 180 degrees, and a third additional tile by rotating the original tile by 270 degrees. Different degrees of rotation may be used and/or different numbers of additional tiles may be generated in other embodiments.

In some embodiments, instead of or in addition to rotating the tiles, the training system may also generate additional tiles by flipping each original tile and each additional tile along an axis (e.g., a horizontal axis, a vertical axis, etc.). For example, by flipping a tile along a horizontal axis and a vertical axis of a given tile, the training system may generate two additional tiles based on the given tile. In the example where the training system rotate each original tile by 90 degrees, 180 degrees, and 270 degrees, and then flip the original tile and the rotated tiles along a horizontal axis and a vertical axis, the training system may be able to produce 11 additional tiles based on an original tile. Thus, the training system may increase the amount of training data by 11 folds, where the additional training data may cover the instances of patients having various pathologies. Furthermore, the training system may also generate additional image tiles by generating different versions of the same image tile, where each version includes added artifacts (e.g., different amounts of speckles, etc.) in the image tile.

The training system may then train the machine learning model using the generated training data (e.g., the tiles and the additional tiles). In some embodiments, the machine learning model may be implemented as a deep convolutional neural network. When training the machine learning model, each piece of training data (e.g., each tile) is first down-sampled through a set of convolution layers, and then up-sampled through a corresponding set of convolution layers. Through the down-sampling and up-sampling of training data, the machine learning model may be trained to identify boundaries of tissues within an OCT image. After training, the machine learning model may be used to identify boundaries of tissues of new OCT images of patients. In some embodiments, the machine learning model may be periodically re-trained using new training data. For example, when a new OCT image is obtained, the training system may be configured to generate training data using the method described herein, and retrain the machine learning model using the newly generated training data.

Figure 1:
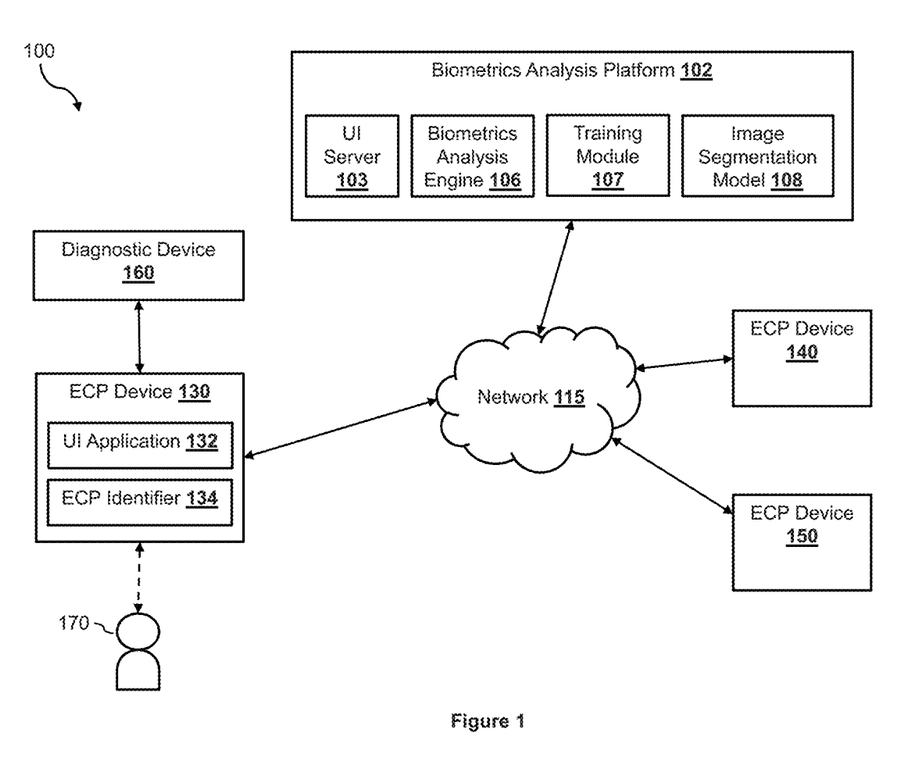
FIG. 1 is a diagram of a system for analyzing biomedical images according to some embodiments.

FIG. 1 illustrates a system 100 within which the training system as discussed herein may be implemented according to some embodiments. System 100 includes a biometrics analysis platform 102 coupled with one or more eyecare professional (ECP) devices, such as ECP devices 130, 140, and 150 via a network 115. In some examples, network 115 may include one or more switching devices, routers, local area networks (e.g., an Ethernet), wide area networks (e.g., the Internet), and/or the like.

Each of the ECP devices (e.g., the ECP devices 130, 140, and 150) may include a user interface (UI) application and an ECP identifier. For example, the ECP device 130 includes a UI application 132 and an ECP identifier 134. The UI application 132 may be used by a corresponding ECP (e.g., the ECP 170) to interact with the biometrics analysis platform 102. For example, the UI application 132 may be a web browser or a client application (e.g., a mobile application). The eyecare professional (ECP) 170, via the UI application 132 may access a graphical user interface (GUI), such as a webpage generated and/or hosted by the biometrics analysis platform 102. The ECP identifier 134 is an identifier that uniquely identifies the ECP 170 among multiple ECP serviced by the lens selection platform 102.

The biometrics analysis platform 102 includes a user interface (UI) server 103, a biometrics analysis engine 106, a training module 107, and an image segmentation model 108. The interface server 103, in some embodiments, is configured to provide a user interface (e.g., a graphical user interface (GUI), etc.) on the ECP device 130, 140, and 150, via which the ECPs such as the ECP 170 may interact with the biometrics analysis platform 102. For example, the UI server 103 of some embodiments may include a web server that hosts a website associated with the lens selection platform 102. The UI server 103 may generate and/or store one or more interactive webpages that may present on the ECP devices via the UI application (e.g., the UI application 132). In another example, the UI server 103 may include an application server that interacts with a client application (e.g., the UI application 132) via a protocol (e.g., REST protocol, etc.).

The image segmentation model 108 may be a machine learning model (e.g., a convolutional neural network, etc.) that is configured to perform segmentation on images (e.g., identify boundaries of different tissues on an image). The training module 107 may be configured to train the image segmentation model 108 by generating training data using techniques disclosed herein. The training module 107 may obtain images of patients (e.g., OCT images of patients' eyes, etc.). The training module 107 may use a conventional algorithm (e.g., a graph search algorithm) to analyze and label the boundaries of different tissues on the images. The training module 107 may then artificially generate additional training data using the techniques disclosed herein. For example, the training data module 107 may obtain tiles from the image (e.g., by dividing the image or extracting tiles from the image) and manipulate each tile (e.g., by changing an orientation of the tile, adding artifacts to the tile, etc.) to generate the additional training data. The training module 107 may then train the image segmentation model 108 using the generated training data. After training the image segmentation module 108, the image segmentation model 108 may be used by the biometrics analysis engine 106 for augmenting images (e.g., OCT images).

In some embodiments, an ECP (e.g., the ECP 170) may provide, via the UI application (e.g., the UI application 132) and the user interface provided by the UI server 103, image data (e.g., an OCT image) of an eye of a patient. For example, the ECP 170 may use the diagnostic device 160 to capture the image (e.g., an OCT image) of the eye of the patient. In some embodiments, the ECP device 130 may be coupled to the diagnostic device 160 such that the ECP device 130 may automatically retrieve the image from the diagnostic device and transmit the image to the biometrics analysis platform 102 via the UI server 103.

In some embodiments, upon receiving the image, the biometrics analysis engine 106 may analyze the image and provide a diagnosis and/or other information regarding the patient's eye to the ECP 170 based on the image. For example, the biometrics analysis engine 106 may use the trained image segmentation model 108 to identify boundaries of different tissues (e.g., different corneal layers) in the image. The biometrics analysis engine 106 may then augment the image by highlighting the identified boundaries in the image and present the augmented image on the ECP device 130. The augmented image may assist the ECP 170 in diagnosis and/or surgical guidance for the patient. In some embodiments, the biometrics analysis engine 106 may analyze the augmented image to provide additional recommendations, such as a selection of an intra-ocular lens or a contact lens for a patient based on the image.

Figure 2:
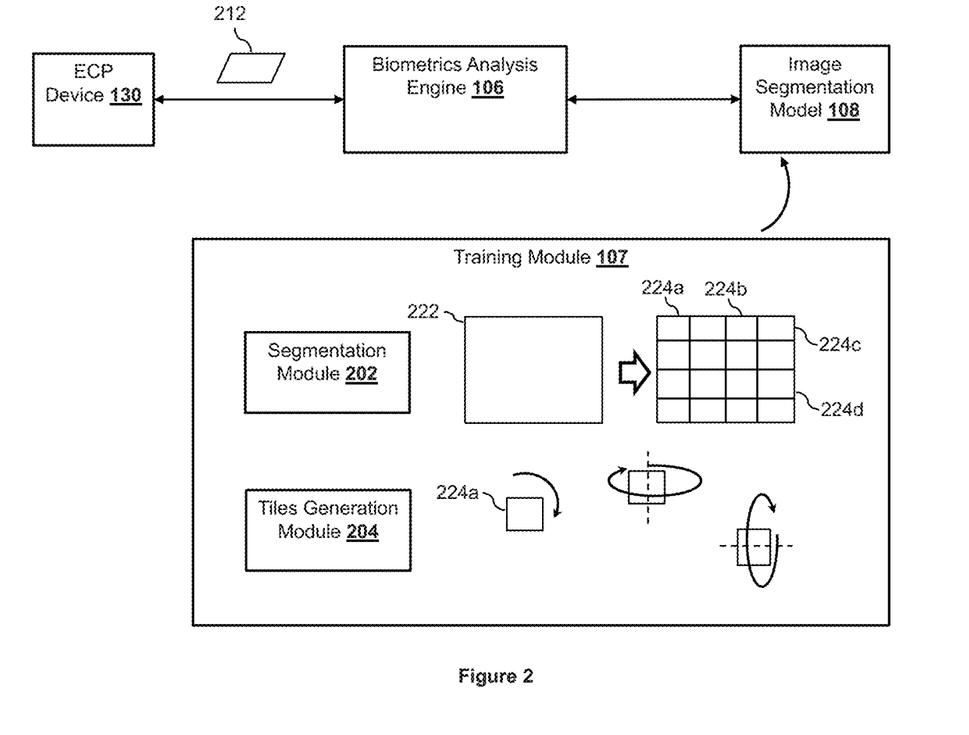
FIG. 2 is a diagram of a training module for training a machine learning model for segmenting biomedical images according to some embodiments.

FIG. 2 illustrates a training module according to various embodiments of the disclosure. As shown, the training module 107 includes a segmentation module 202 and a tiles generation module 204. The training module 107 may use the segmentation module 202 to analyze and label existing images (e.g., an image 222), for example, by using a graph-search algorithm. The training module 107 may then use the tiles generation module 204 to obtain image tiles from each of the labeled images as training data for training the image segmentation model 108. For example, the tile generation module 204 may divide the image 222 into image tiles (e.g., image tiles 224a-224d, also referred to as original image tiles 224a-224d). The tile generation module 204 may then manipulate the original image tiles 224a-224d to generate additional image tiles. In some embodiments, the tile generation module 204 may rotate each of the original image tiles 224a-224d a number of times by different degrees of rotations to generate additional image tiles. Furthermore, the tiles generation module 204 may also flip each original image tiles 224a-224d and each additional image tile along an axis (e.g., a horizontal axis, a vertical axis, etc.) to generate additional image tiles for training the image segmentation model 108.

Figure 3:
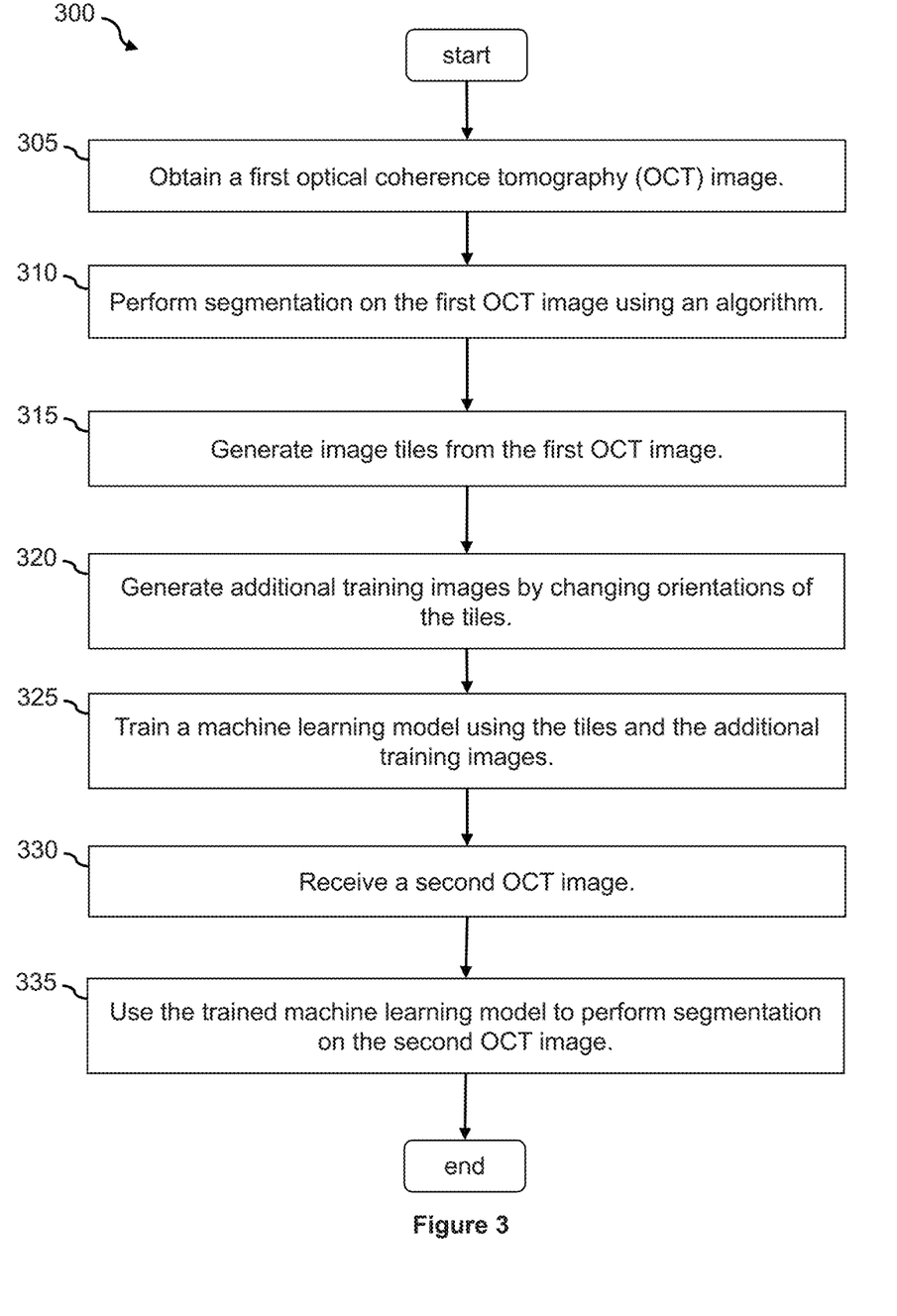
FIG. 3 illustrates a process of training the machine learning model according to some embodiments.

FIG. 3 illustrates a process 300 for training an image segmentation model configured to perform segmentation on images according to one embodiment of the disclosure. In some embodiments, the process 300 may be performed by the training module 107 and/or the biometrics analysis engine 106. The process 300 begins by obtaining a first optical coherence tomography (OCT) image. For example, the training module 107 may obtain training images, such as existing images taken of patients (e.g., existing OCT images taken of patient's eyes) in the past. In some embodiments, the existing images can be obtained from one or more ECP devices, such as ECP devices 130, 140, and 150. For example, ECPs (e.g., the ECP 170) may capture OCT images of patients (e.g., using diagnostic devices such as the diagnostic device 160). The ECPs may transmit the OCT images to the biometrics analysis platform 102 for analysis, for example, for performing segmentation on the images.

Figure 4A:
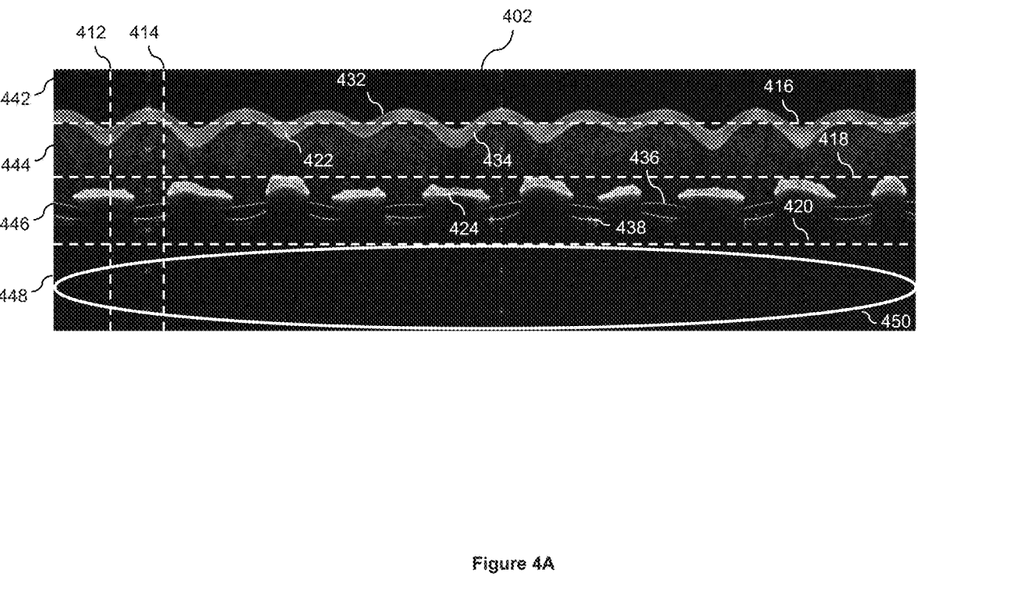
FIG. 4A illustrates an exemplary method for dividing a biomedical image according to some embodiments.

The process 300 then performs (at step 310) segmentation on the first OCT image using an algorithm and generate (at step 315) image tiles from the first OCT image. For example, the segmentation module 202 of the training module 107 may use a conventional algorithm (e.g., a graph search algorithm) to analyze and label the obtained images (e.g., by identifying boundaries of different types of tissues, such as different layers of an eye, in the training images). FIG. 4A illustrates an exemplary OCT image 402 that may be obtained from the ECP device 130. In this example, the OCT image 402 is an image of a patient's eye, and specifically, different corneal layers of the eye. For example, the OCT image 402 may show the eye including a layer 422 and a layer 424. As shown, due to artifacts and other issues with the image 402, the boundaries of the layers 422 and 424 may not be very clear, and/or may discontinue. As such, the segmentation module 202 may use a graph search algorithm to identify boundaries of the different layers. As shown in the image 402, by using the graph search algorithm, the segmentation module 202 may highlight the boundaries of the layers, including boundaries 432 and 434 for the layer 422, and boundaries 436 and 438 for the layer 424.

The training module 107 may then use the labeled images (e.g., the labeled OCT image 402) as training images for training the image segmentation module 108. As shown in FIG. 4A, the layers 422 and 424 exhibits one or more patterns with distinctive features. For example, the layer 422 has a wave patterns include multiple peaks and troughs, where each cycle of the wave has distinctive features or characteristics (e.g., amplitudes, thicknesses, etc.). Any portion of the layer 422 may include distinct characteristics for training the image segmentation model 108. Similarly, the layer 424 includes discontinued patches of elongated-shaped elements, wherein each of these elements may have distinctive features or characteristics for training the image segmentation model 108. As such, in some embodiments, instead of using the image 402 as a whole as a piece of training data, the training module 107 may obtain tiles (or patches) of the image 402 as training data.

Different embodiments may use different techniques in obtaining image tiles from a training image (e.g., the image 402). In some embodiments, the tiles generation module 204 of the training module 107 may divide the training image into multiple tiles. For example, when the image 402 has a size of 160 by 40 pixels, the tiles generation module 204 may divide the image 402 into sixty-four (64) equally-sized (10 by 10 pixels) tiles. As shown in FIG. 4A, the tiles generation module 204 may use virtual lines 412-420 to divide the image 402 up into multiple tiles, such as tiles 442-448. In some embodiments, the tiles generation module 204 may obtain a device attribute (e.g., a memory size of a graphical processing unit) of the device (e.g., a computer server such as the biometrics analysis platform 102, etc.) that is configured to generate the training data, and may divide the image based on the device attribute. For example, the tiles generation module 204 may determine a tile size that does not exceed the memory size of the graphical processing unit of the device (e.g., 8 GB, 16 GB, etc.), and may then divide the image 402 into tiles based on the tile size, such that each tile may have a size not exceeding the memory size of the graphical processing unit.

In some embodiments, the tiles generation module 204 may also perform one or more analyses on the image 402 and may divide the image based on the one or more analyses. For example, the tiles generation module 204 may perform a pixel analysis to determine portions of the image that do not include relevant data (e.g., portions of the image that include background or blank data). In this regard, the tiles generation module 204 may analyze the pixel value of each pixel in the image to determine portions of the image having contiguous pixels with substantially similar (or identical) pixel values (e.g., spatial frequency within the portions below a threshold). The tiles generation module 204 may then eliminate (e.g., remove) the portions of the image before dividing the image into the multiple tiles. For example, the tiles generation module 204 may determine that a portion 450 of the image 402 does not have relevant data based on low spatial frequency and lack of labeled data (e.g., labeled boundary) within the portion 450. Thus, the tiles generation module 204 may remove the portion 450 from the image 402 before dividing the image 402 into tiles.

In some embodiments, instead of dividing the image into multiple tiles, the tiles generation module 204 may generate the image tiles by extracting different image portions from the training image (e.g., the image 402). For example, the tiles generation module 204 may provide a virtual window having the determined tile size (e.g., 10 by 10 pixels) on the image. The tiles generation module 204 may place the virtual window at an initial position (e.g., top left corner) of the image. The tiles generation module 204 may analyze the portion of the image within the virtual window to determine whether the portion of the image passes a relevance threshold. If it is determined that the portion of the image passes the relevance threshold, the tiles generation module 204 may extract the portion of the image as an image tile. On the other hand, if it is determined that the portion of the image does not pass the relevance threshold, the tiles generation module 204 may ignore the portion of the image. In some embodiments, the tiles generation module 204 may determine whether a portion of image passes the relevance threshold based on one or more factors, such as whether a spatial frequency of the portion of image exceeds a spatial frequency threshold, whether the portion of the image includes labeled data (e.g., includes a portion of a boundary of different tissues labeled by the graph search algorithm), etc.

Figure 4B:
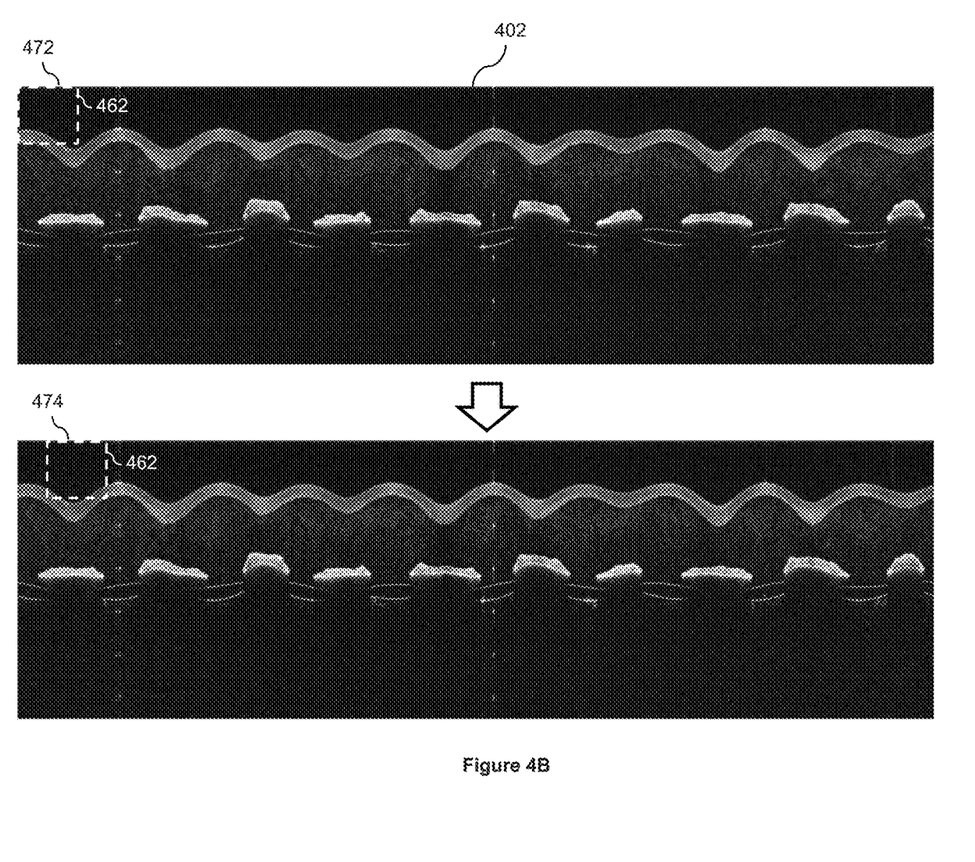
FIG. 4B illustrates an exemplary method for extracting image tiles from a biomedical image according to some embodiments.

FIG. 4B illustrates a virtual window 462 provided on the image 402, for example, by the tiles generation module 204. The virtual window 462 is provided at an initial position (e.g., top left corner) that covers a first image portion 472 of the image 402. The tiles generation module 204 may analyze the image portion 472 of the image 402 within the virtual window 462 to determine whether the image portion 472 passes a relevance threshold. For example, the tiles generation module 204 may analyze the pixel values of the image portion 472 to determine whether a spatial frequency exceeds a predetermined threshold. The tiles generation module 204 may also determine whether labeled data (e.g., identified boundary based on the graph search algorithm) is included within the image portion 472. The tiles generation module 204 may then determine whether the image portion 472 of the image 402 passes the relevance threshold, for example, based on the spatial frequency and/or the existence of labeled data of the image portion 472 of the image 402. If it is determined that the image portion 472 passes the relevance threshold, the tiles generation module 204 may extract the image portion 472 of the image 402 as an image tile. On the other hand, if it is determined that the image portion 472 of the image 402 does not pass the relevance threshold, the tiles generation module 204 may ignore the image portion 472. In this example, since the image portion 472 includes a part of the labeled boundary 432, the tiles generation module 204 may determines that the image portion 472 passes the relevance threshold, and thus extract the image portion 472 from the image 402.

After extracting (or ignoring) the portion of the image within the virtual window, the tiles generation module 204 may then move the virtual window to another position to cover another portion of the image (e.g., moving the virtual window by a predetermined number of pixels to the right, to the bottom, etc.). For example, as shown in FIG. 4B, the tiles generation module 204 may move, after extracting or ignoring the image portion 472, the virtual window 462 a predetermined number of pixels (e.g., 5 pixels) to the right to cover a second image portion 474 of the image 402. the tiles generation module 204 may continue to analyze different portions of the image covered by the virtual window and extract the portions that pass the relevance threshold. Based on the predetermined movement of the virtual window, the different portions of the image cover by the virtual window may or may not overlap with each other, such that the image tiles extracted from the image may be partially overlapping. In this example, the image portions 472 and 474 partially overlap with each other. Each image tile that is extracted from the image can become a distinct piece of training data for training the image segmentation model 108. By independently analyzing different portions of the image and extracting only the portions that are relevant may substantially improve the quality of the training data.

Figure 5:
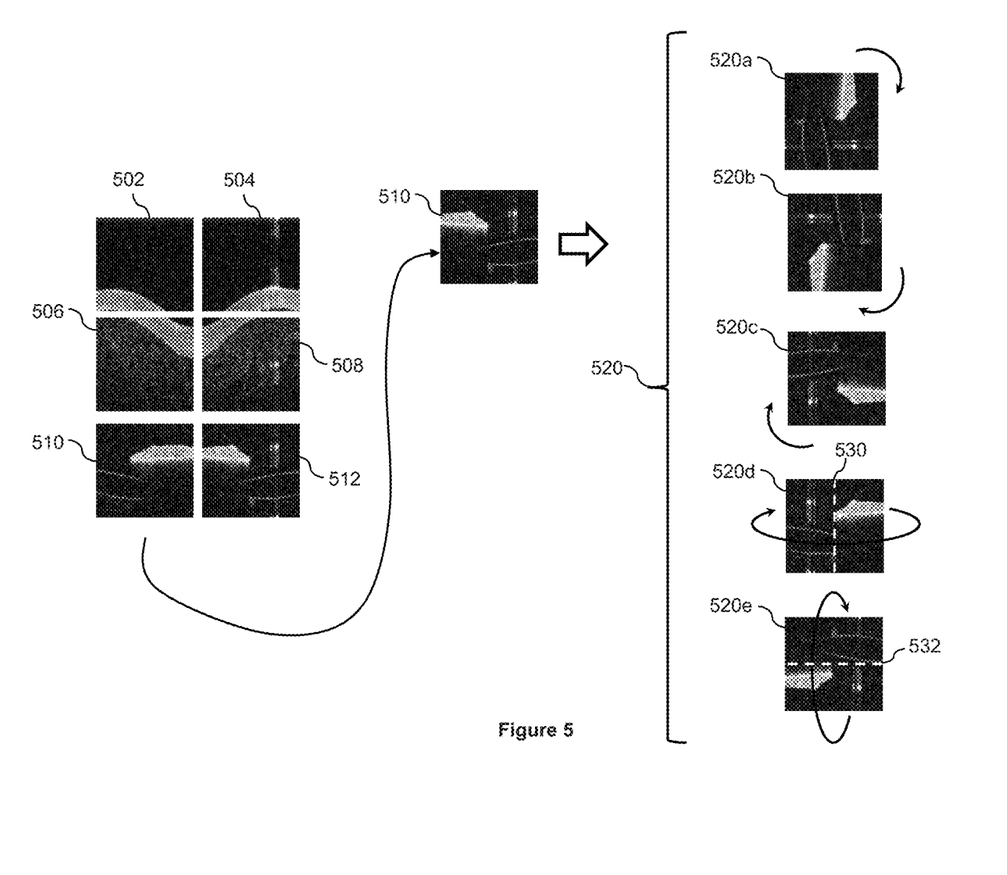
FIG. 5 illustrates generating additional image types by manipulating at least one image tile according to some embodiments.

FIG. 5 illustrates exemplary image tiles 502-512 obtained from the image 402 (either by dividing the image 402 or by extracting the tiles from the image 402 using a virtual window). Each of the image tiles (also referred to as the original image tiles) may be used as a piece of training data for training the image segmentation model 108. However, as discussed herein, one drawback of using a conventional algorithm to segment images is that the conventional algorithm may not be effective in performing segmentation on images having a substantial amount of artifacts (e.g., speckles) or images of patients with different pathologies (e.g., different eye diseases). As such, the training data (e.g., the original image tiles) generated by using the conventional algorithm may be limited (e.g., only images that do not have substantial amounts of artifacts and images of normal patients are labeled). Thus, in some embodiments, the training module 107 may artificially generate additional training data corresponding to patients having various pathologies by manipulating the original image tiles.

Referring back to FIG. 3, the process 300 generates (at step 320) additional training images by changing orientations of the tiles. For example, the training module 107 may manipulate the original image tiles by adjust the orientation of each original image tile (which effectively changing an orientation of the identified boundaries of layers in the image tiles) to simulate images of patients having various pathologies. In some embodiments, the training module 107 may generate additional tiles by rotating each original image tile by one or more rotations, where each additional tile corresponds to rotating the tile to a predetermined degree of rotation. For example, the training module 107 may manipulate each original image tile by rotating each original image tile by 90 degrees, 180 degrees, and 270 degrees. As shown in FIG. 5, the training module 107 may rotate an original image tile (e.g., the image tile 510) by 90 degrees to generate an additional image tile 520a. The training module 107 may also rotate the image tile 510 by 180 degrees to generate an additional image tile 520b. The training module 107 may also rotate the image tile 510 by 270 degrees to generate an additional image tile 520c. Thus, in this example, for each original image tile, the training module 107 may generate three additional tiles (e.g., three additional pieces of training data) based on rotating the original image tile—a first additional tile that corresponds to rotating the original tile by 90 degrees, a second additional tile that corresponds to rotating the original tile by 180 degrees, and a third additional tile by rotating the original tile by 270 degrees. Different degrees of rotation may be used and/or different numbers of additional tiles may be generated in other embodiments. For example, by rotating the original image tiles by additional degrees of rotation, a larger number of additional tiles may be generated.

In some embodiments, instead of or in addition to rotating the tiles, the training module 107 may also generate additional tiles by flipping each original tile and each additional tile along an axis (e.g., a horizontal axis, a vertical axis, etc.). For example, by flipping a tile along a horizontal axis and a vertical axis of a given tile, the training module 107 may generate two additional tiles based on the given tile. As shown in FIG. 5, the training module 107 may generate an additional image tile 520d by flipping the image tile 510 along a vertical axis 530. The training module 107 may also generate another additional image tile 520e by flipping the image tile 510 along a horizontal axis 525. In some embodiments, the training module 107 may also generate additional image tiles by flipping the image tiles 520a-520c. Thus, in the example where the training data system rotate each original tile by 90 degrees, 180 degrees, and 270 degrees, and then flip the original tile and the rotated tiles along a horizontal axis and a vertical axis, the training module 107 may be able to produce 11 additional tiles based on an original tile. As a result, the training module 107 may increase the amount of training data by 11 folds, where the additional training data may cover the instances of patients having various pathologies. Furthermore, the training module 107 may generate additional tiles by deriving different versions of the same image tiles (e.g., adding varying amounts of artifacts to the same image tiles).

The training module 107 may then train the image segmentation model 108 using the generated training data (e.g., the tiles and the additional tiles). In some embodiments, the segmentation model 108 may be implemented as a deep convolutional neural network, using techniques described in the literature titled "U-Net: Convolutional Networks for Biomedical Image Segmentation" by Ronneberger et al., which is incorporated by reference herein in its entirety. As described in Ronneberger, when training the image segmentation model 108, each piece of training data (e.g., each image tile) is first down-sampled through a set of convolution layers, and then up-sampled through a corresponding set of convolution layers. Through the down-sampling and up-sampling of training data, the image segmentation model 108 may be trained to identify boundaries of tissues within an OCT image. After training, the image segmentation model 108 may be used to identify boundaries of tissues of new OCT images of patients. In some embodiments, the image segmentation model 108 may be periodically retrained using new training data. For example, when a new OCT image is obtained, the training module 107 may be configured to generate training data using the method described herein, and retrain the image segmentation model 108 using the newly generated training data.

Referring back to FIG. 3, the process 300 receives (at step 330) a second OCT image and uses (at step 335) the trained machine learning model to perform segmentation on the second OCT image. For example, the biometrics analysis engine 106 may receive an image from one of the ECP devices 130, 140, and 150, for example, via the UI server 103. The biometrics analysis engine 106 may use the image segmentation model 108 to identify boundaries of different layers (e.g., different types of tissues) in the image. In some embodiments, the biometrics analysis engine 106 may divide the image into image tiles, where each image tile has the predetermined size (e.g., the size determined for generating image tiles for training the image segmentation model 108). The biometrics analysis engine 106 may provide the image tiles to the image segmentation model 108 one by one to obtain identification of boundaries of different layers (or different types of tissues) in the image tiles.

In some embodiments, the biometrics analysis engine 106 may augment the image by highlighting the different layers or the boundaries of the different layers in the image, and present the augmented image to the ECP device. In some embodiments, the biometrics analysis engine 106 may perform additional analyses to the image based on the identified layers, and may present a report (e.g., a recommendation of a type of intra-ocular lens or a type of contact lens for a patient, etc.) on the ECP device.

Figure 6A:
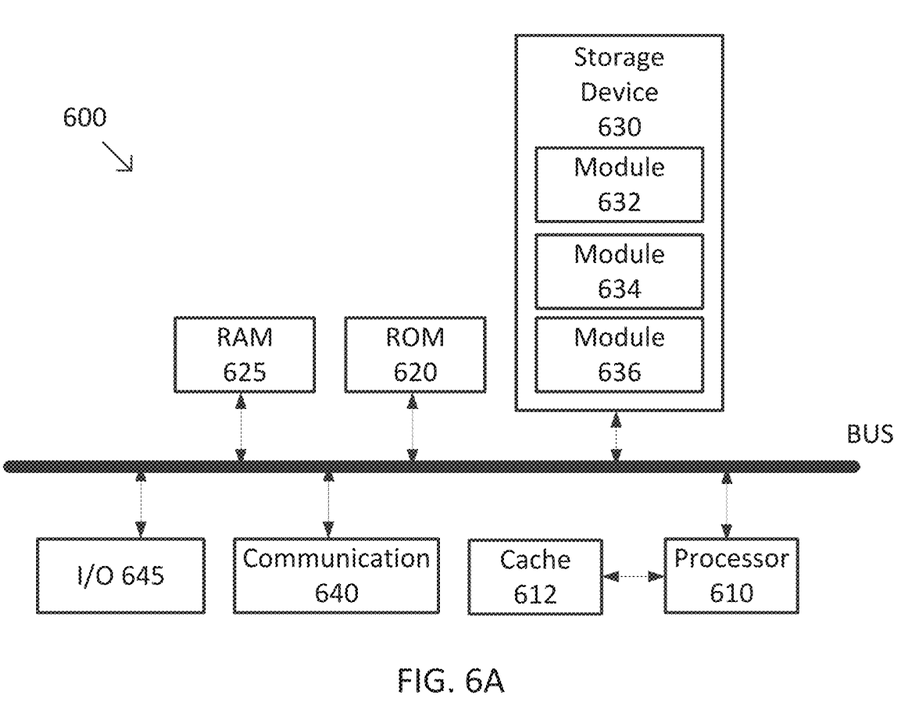
FIGS. 6A and 6B are diagrams of processing systems according to some embodiments.
Figure 6B:
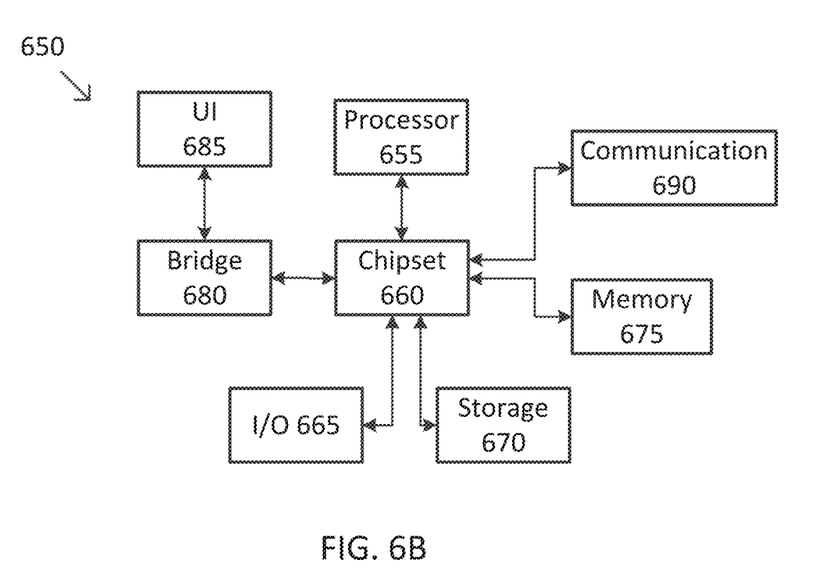

FIGS. 6A and 6B are diagrams of processing systems according to some embodiments. Although two embodiments are shown in FIGS. 6A and 46B, persons of ordinary skill in the art will also readily appreciate that other system embodiments are possible. According to some embodiments, the processing systems of FIGS. 6A and/or 6B are representative of computing systems that may be included in one or more of biometrics analysis platform 102 and the ECP devices 130, 140, and 150, and/or the like.

FIG. 6A illustrates a computing system 600 where the components of system 600 are in electrical communication with each other using a bus 605. System 600 includes a processor 610 and a system bus 605 that couples various system components including memory in the form of a read only memory (ROM) 620, a random access memory (RAM) 625, and/or the like (e.g., PROM, EPROM, FLASH-EPROM, and/or any other memory chip or cartridge) to processor 610. System 600 may further include a cache 612 of high-speed memory connected directly with, in close proximity to, or integrated as part of processor 610. System 600 may access data stored in ROM 620, RAM 625, and/or one or more storage devices 630 through cache 612 for high-speed access by processor 610. In some examples, cache 612 may provide a performance boost that avoids delays by processor 610 in accessing data from memory 615, ROM 620, RAM 625, and/or the one or more storage devices 630 previously stored in cache 612. In some examples, the one or more storage devices 630 store one or more software modules (e.g., software modules 632, 634, 636, and/or the like). Software modules 632, 634, and/or 636 may control and/or be configured to control processor 610 to perform various actions, such as the process of method 300. And although system 600 is shown with only one processor 610, it is understood that processor 610 may be representative of one or more central processing units (CPUs), multi-core processors, microprocessors, microcontrollers, digital signal processors (DSPs), field programmable gate arrays (FPGAs), application specific integrated circuits (ASICs), graphics processing units (GPUs), tensor processing units (TPUs), and/or the like. In some examples, system 600 may be implemented as a stand-alone subsystem and/or as a board added to a computing device or as a virtual machine.

To enable user interaction with system 600, system 600 includes one or more communication interfaces 640 and/or one or more input/output (I/O) devices 645. In some examples, the one or more communication interfaces 640 may include one or more network interfaces, network interface cards, and/or the like to provide communication according to one or more network and/or communication bus standards. In some examples, the one or more communication interfaces 440 may include interfaces for communicating with system 600 via a network, such as network 115. In some examples, the one or more I/O devices 645 may include on or more user interface devices (e.g., keyboards, pointing/selection devices (e.g., mice, touch pads, scroll wheels, track balls, touch screens, and/or the like), audio devices (e.g., microphones and/or speakers), sensors, actuators, display devices, and/or the like).

Each of the one or more storage devices 630 may include non-transitory and non-volatile storage such as that provided by a hard disk, an optical medium, a solid-state drive, and/or the like. In some examples, each of the one or more storage devices 630 may be co-located with system 600 (e.g., a local storage device) and/or remote from system 600 (e.g., a cloud storage device).

FIG. 6B illustrates a computing system 650 based on a chipset architecture that may be used in performing any of the methods (e.g., methods 300 and/or 510) described herein. System 650 may include a processor 655, representative of any number of physically and/or logically distinct resources capable of executing software, firmware, and/or other computations, such as one or more CPUs, multi-core processors, microprocessors, microcontrollers, DSPs, FPGAs, ASICs, GPUs, TPUs, and/or the like. As shown, processor 655 is aided by one or more chipsets 660, which may also include one or more CPUs, multi-core processors, microprocessors, microcontrollers, DSPs, FPGAs, ASICs, GPUs, TPUs, co-processors, coder-decoders (CODECs), and/or the like. As shown, the one or more chipsets 660 interface processor 655 with one or more of one or more I/O devices 665, one or more storage devices 670, memory 675, a bridge 680, and/or one or more communication interfaces 690. In some examples, the one or more I/O devices 665, one or more storage devices 670, memory, and/or one or more communication interfaces 690 may correspond to the similarly named counterparts in FIG. 6A and system 600.

In some examples, bridge 680 may provide an additional interface for providing system 650 with access to one or more user interface (UI) components, such as one or more keyboards, pointing/selection devices (e.g., mice, touch pads, scroll wheels, track balls, touch screens, and/or the like), audio devices (e.g., microphones and/or speakers), display devices, and/or the like. According to some embodiments, systems 600 and/or 650 may provide a graphical user interface (GUI) suitable for aiding a user (e.g., a surgeon and/or other medical personnel) in the performance of the processes of method 200.

Methods according to the above-described embodiments may be implemented as executable instructions that are stored on non-transitory, tangible, machine-readable media. The executable instructions, when run by one or more processors (e.g., processor 610 and/or processor 655) may cause the one or more processors to perform the process of method 300. Some common forms of machine-readable media that may include the process of method 300 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Devices implementing methods according to these disclosures may comprise hardware, firmware, and/or software, and may take any of a variety of form factors. Typical examples of such form factors include laptops, smart phones, small form factor personal computers, personal digital assistants, and/or the like. Portions of the functionality described herein also may be embodied in peripherals and/or add-in cards. Such functionality may also be implemented on a circuit board among different chips or different processes executing in a single device, by way of further example.

Figure 7:
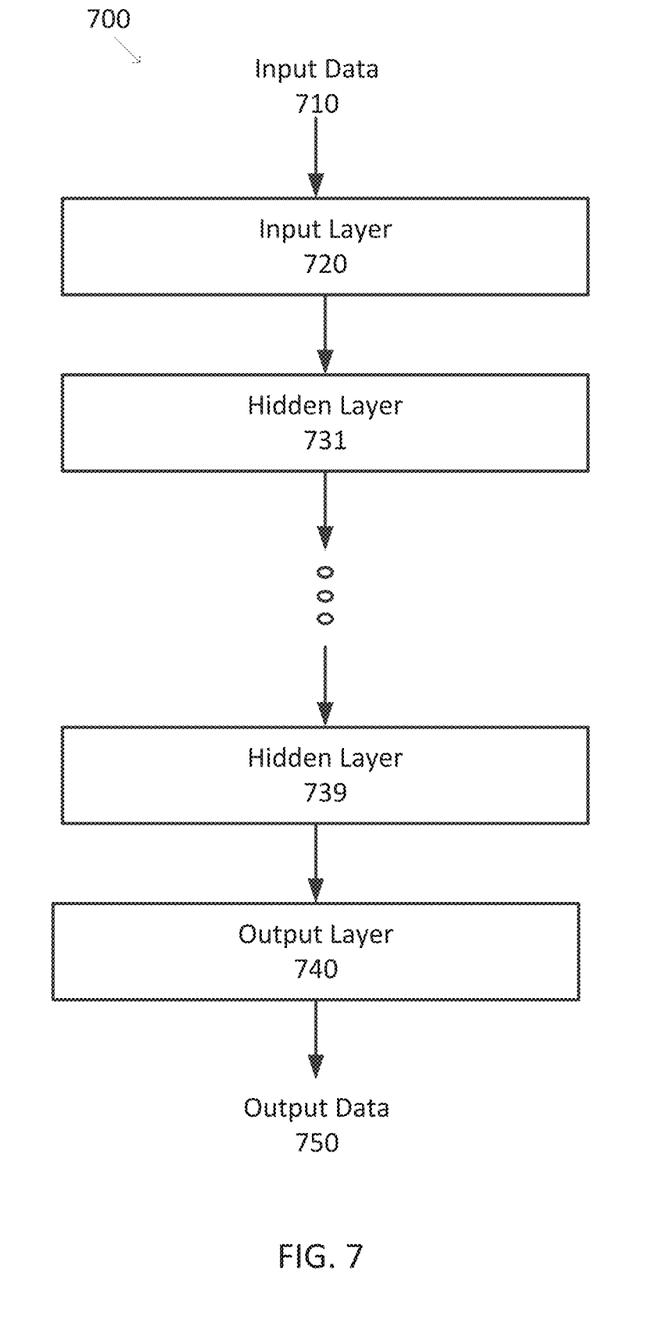
FIG. 7 is a diagram of a multi-layer neural network according to some embodiments.

FIG. 7 is a diagram of a multi-layer neural network 700 according to some embodiments. In some embodiments, neural network 700 may be representative of a neural network used to implement a machine learning model for performing segmentation on images such as OCT images as discussed herein. Neural network 700 processes input data 710 using an input layer 720. In some examples, input data 710 may correspond to the input data provided to the one or more models and/or the training data provided to the one or more models during the training process used to train the one or more models. Input layer 720 includes a plurality of neurons that are used to condition input data 710 by scaling, range limiting, and/or the like. Each of the neurons in input layer 720 generates an output that is fed to the inputs of a hidden layer 731. Hidden layer 731 includes a plurality of neurons that process the outputs from input layer 720. In some examples, each of the neurons in hidden layer 731 generates an output that are then propagated through one or more additional hidden layers that end with hidden layer 739. Hidden layer 739 includes a plurality of neurons that process the outputs from the previous hidden layer. The outputs of hidden layer 739 are fed to an output layer 740. Output layer 740 includes one or more neurons that are used to condition the output from hidden layer 739 by scaling, range limiting, and/or the like. It should be understood that the architecture of neural network 700 is representative only and that other architectures are possible, including a neural network with only one hidden layer, a neural network without an input layer and/or output layer, a neural network with recurrent layers, and/or the like.

In some examples, each of input layer 720, hidden layers 731-739, and/or output layer 740 includes one or more neurons. In some examples, each of input layer 720, hidden layers 731-739, and/or output layer 740 may include a same number or a different number of neurons. In some examples, each of the neurons takes a combination (e.g., a weighted sum using a trainable weighting matrix W) of its inputs x, adds an optional trainable bias b, and applies an activation function f to generate an output a as shown in Equation 1. In some examples, the activation function f may be a linear activation function, an activation function with upper and/or lower limits, a log-sigmoid function, a hyperbolic tangent function, a rectified linear unit function, and/or the like. Activation function can be non-linear as well such as a rectified linear unit (ReLU) activation function. In some examples, each of the neurons may have a same or a different activation function.

$$a=f(Wx+b) \qquad (1)$$

In some examples, neural network 700 may be trained using supervised learning where combinations of training data (e.g., biometric data of patients, etc.) that include a combination of input data and a ground truth (e.g., expected) output data (e.g., lens products selected by ECPs for the patients in the past, etc.). Differences between the output of neural network 700 as generated using the input data for input data 710 and comparing output data 750 as generated by neural network 700 to the ground truth output data. Differences between the generated output data 750 and the ground truth output data may then be fed back into neural network 700 to make corrections to the various trainable weights and biases. In some examples, the differences may be fed back using a back propagation technique using a stochastic gradient descent algorithm, and/or the like. In some examples, a large set of training data combinations may be presented to neural network 700 multiple times until an overall loss function (e.g., a mean-squared error based on the differences of each training combination) converges to an acceptable level.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A system, comprising:
   a non-transitory memory; and
   one or more hardware processors coupled with the non-transitory memory and configured to read instructions from the non-transitory memory to cause the system to perform operations comprising:
   obtaining an optical coherence tomography (OCT) image;
   determining edges in the OCT image based on an edge detection algorithm or manual annotations;
   generating a plurality of image tiles based on the OCT image;
   generating a plurality of additional image tiles by manipulating at least one image tile of the plurality of image tiles; and
   training a machine learning model for predicting edges in OCT images based on the plurality of image tiles and the plurality of additional image tiles.

2. The system of claim 1, wherein the manipulating the at least one image tile comprises at least one of rotating the at least one image tile or flipping the at least one image tile along an axis.

3. The system of claim 2, wherein the plurality of additional image tiles comprises image tiles corresponding to rotating the at least one image tile at 0 degrees, 90 degrees, 180 degrees, and 270 degrees.

4. The system of claim 2, wherein the plurality of additional image tiles comprises an image tile corresponding to flipping the at least one image tile along at least one of a vertical axis or a horizontal axis.

5. The system of claim 1, wherein the edge detection algorithm comprises a graph search algorithm.

6. The system of claim 1, wherein the machine learning model comprises a deep convolutional neural network.

7. The system of claim 1, wherein the operations further comprise predicting edges in a second OCT image using the trained machine learning model.

8. A method comprising:
   obtaining a biomedical image;
   determining boundaries of different tissues in the biomedical image based on an edge detection algorithm;
   generating a first plurality of image tiles based on the biomedical image;
   generating a second plurality of image tiles by manipulating at least one image tile of the first plurality of image tiles; and
   training, by one or more hardware processors, a machine learning model for segmenting biomedical images based on the first plurality of image tiles and the second plurality of image tiles.

9. The method of claim 8, wherein the determined boundaries correspond to anterior corneal layers of an eye within the biomedical image.

10. The method of claim 8, wherein the generating the first plurality of image tiles comprises dividing the biomedical image into image patches.

11. The method of claim 10, further comprising analyzing one or more characteristics of the biomedical image, wherein the biomedical image is divided into the first plurality of image tiles based on the analyzing.

12. The method of claim 8, wherein the generating the first plurality of image tiles comprises:
   analyzing a plurality of different portions of the biomedical image; and
   selecting, from the plurality of different portions, a subset of portions of the biomedical image that passes a relevance threshold.

13. The method of claim 12, wherein the analyzing the plurality of different portions comprises determining whether a portion of the biomedical image from the plurality of different portions include a boundary determined by the edge detection algorithm.

14. The method of claim 8, wherein at least two image tiles in the second plurality of image tiles are partially overlapping.

15. A non-transitory machine-readable medium having stored thereon machine-readable instructions executable to cause a machine to perform operations comprising:
   obtaining an optical coherence tomography (OCT) image;
   analyzing the OCT image based at least in part on an edge detection algorithm;
   generating a first plurality of image tiles based on the analyzing the OCT image;
   generating a second plurality of image tiles by manipulating at least one image tile of the first plurality of image tiles; and
   training a machine learning model for segmenting OCT images based on the first plurality of image tiles and the second plurality of image tiles.

16. The non-transitory machine-readable medium of claim 15, wherein the analyzing the OCT image comprises identifying edges in the OCT image.

17. The non-transitory machine-readable medium of claim 16, wherein the operations further comprise:
   determining a number of edges identified within each image tile in the first plurality of image tiles; and selecting the at least one image tile from the first plurality of tiles for generating the second plurality of image tiles based on the number of edges identified within each image tile.

18. The non-transitory machine-readable medium of claim 15, wherein the manipulating the at least one image tile comprises at least one of rotating the at least one image tile or flipping the at least one image tile along an axis.

19. The non-transitory machine-readable medium of claim 18, wherein the second plurality of image tiles comprises image tiles corresponding to rotating the at least one image tile at 0 degrees, 90 degrees, 180 degrees, and 270 degrees.

20. The non-transitory machine-readable medium of claim 18, wherein the second plurality of image tiles comprises an image tile corresponding to flipping the at least one image tile along at least one of a vertical axis or a horizontal axis.

* * * * *